United States Patent
Kobayashi et al.

(10) Patent No.: US 6,592,966 B1
(45) Date of Patent: Jul. 15, 2003

(54) BIAXIALLY ORIENTATED MULTI LAYER POLYESTER FILM

(75) Inventors: Ieyasu Kobayashi, Sagamihara (JP); Toshifumi Osawa, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/979,173

(22) PCT Filed: May 18, 2000

(86) PCT No.: PCT/JP00/03188

§ 371 (c)(1), (2), (4) Date: Nov. 20, 2001

(87) PCT Pub. No.: WO00/71339

PCT Pub. Date: Nov. 30, 2000

(30) Foreign Application Priority Data

May 25, 1999 (JP) ............................................ 11-145026

(51) Int. Cl.⁷ .............................................. G11B 5/733
(52) U.S. Cl. ........................ 428/141; 428/212; 428/216; 428/327; 428/328; 428/331; 428/480; 428/694 SL
(58) Field of Search ................................ 428/141, 212, 428/216, 327, 328, 331, 480, 694 SL

(56) References Cited

FOREIGN PATENT DOCUMENTS

| EP | 0 651 379 A1 | 5/1995 |
|---|---|---|
| EP | 10156937 | 6/1998 |
| EP | 0 950 681 A1 | 10/1999 |
| JP | A-9-314774 | 12/1997 |
| JP | A-10-000751 | 6/1998 |
| JP | 11-134638 | 5/1999 |

OTHER PUBLICATIONS

Abstract, JP–A–10–000751, Jun. 1, 1998.

Abstract, JP–A–9–314774, Dec. 9, 1997.

Primary Examiner—Stevan A. Resan
(74) Attorney, Agent, or Firm—Sughrue Mion, PLLC

(57) ABSTRACT

A biaxially oriented laminated polyester film which is excellent in film winding properties and handling properties and provides excellent electromagnetic conversion characteristics when it is used as a base film for high-density magnetic recording media, particularly digital recording magnetic recording media. This film consists of a polyester A layer and a polyester B layer formed on one side of the polyester A layer and is characterized in that: (1) the polyester A layer contains three different types of fine particles which differ from one another in average particle diameter and has a surface roughness WRa of 5 to 20 nm and a WRz of 100 to 300 nm, (2) the polyester B layer has a surface roughness WRa of 2 to 10 nm and a WRz of 30 to 150 nm, and (3) the film has a friction coefficient of 0.5 or less.

17 Claims, 2 Drawing Sheets length equivalent to one round of a roll debris having a diameter of 2 mm or more Wa, Wb: longitudinal wrinkles which cannot be removed by lightly pulling by hand Wo: width of a film product $$\text{proportion of longitudinal wrinkles} = \frac{W_a + W_b}{W_o} \times 100\ (\%)$$

BIAXIALLY ORIENTATED MULTI LAYER POLYESTER FILM

FIELD OF THE INVENTION

The present invention relates to a biaxially oriented laminated polyester film. More specifically, it relates to a biaxially oriented laminated polyester film which is excellent in film winding properties and handling properties and provides excellent electromagnetic conversion characteristics when it is used as a base film for high-density magnetic recording media, particularly digital magnetic recording media.

DESCRIPTION OF THE PRIOR ART

A biaxially oriented polyester film typified by a polyethylene terephthalate film is used for various purposes, particularly as a base film for magnetic recording media, thanks to its excellent physical and chemical properties.

In recent years, along with efforts made to increase the density and capacity of a magnetic recording medium, a base film having a more smooth surface and a smaller thickness has been desired. Particularly, a heavy-layer metal type magnetic tape having performance equivalent to a deposited magnetic tape has recently been developed and demand for a base film having a smooth surface has been growing more and more.

However, when the surface of a base film is smoothened to retain excellent electromagnetic conversion characteristics, its slipperiness or air squeezability deteriorates. As a result, when the film is rolled, it is apt to wrinkle or form debris, thereby making it extremely difficult to roll the film nicely. When the slipperiness of the base film is low in the film processing step, the friction of the base film with a metal roll in contact with the base film increases, whereby the film wrinkles, a magnetic layer cannot be applied well, or the film cannot be calendered well.

To improve the slipperiness of the polyester film, the following methods are employed: (i) one in which inert particles are deposited by the catalyst residue in a raw material polymer in the production process and (ii) one in which the surface of the film is finely uneven by adding inert particles or the like. Generally speaking, the greater the size and content of particles contained in the film, the more the slipperiness of the film improves.

As described above, the surface of the base film is desired to be as smooth as possible in order to improve electromagnetic conversion characteristics. When the surface of the base film is rough and a magnetic recording medium is formed using the base film, protrusions on the surface of the base film thrust up the surface of a magnetic layer after the application of the magnetic layer, thereby deteriorating electromagnetic conversion characteristics. In this case, the greater the size and content of particles contained in the base film, the more the surface of the film becomes rough, thereby deteriorating electromagnetic conversion characteristics.

To improve both slipperiness and electromagnetic conversion characteristics which are conflicting properties at the same time, there is widely known means of producing a laminated film consisting of two layers which differ from each other in surface roughness: the surface of one layer on which a magnetic layer is applied is made smooth to improve electromagnetic conversion characteristics and the surface of the other layer is made rough to improve slipperiness.

However, even when the above biaxially oriented laminated polyester film is used and the surface (to be referred to as "rough surface" hereinafter) opposite to the magnetic layer application surface is roughened, if the thickness of the base film is very small, a lubricant contained in the layer of the rough surface affects the layer of the magnetic layer application surface (smooth surface) according to its type, particle diameter and content and undulates the smooth surface, thereby worsening the smoothness of the smooth surface.

Particularly, in the latest high-density magnetic recording medium, a magnetic layer having a more smooth surface is desired, a metal calender having a high linear pressure is used, and a lubricant contained in the rough side layer has a greater bad influence upon the surface properties of the smooth surface by thrusting up the smooth surface.

To reduce the number of protrusions thrusting up the smooth side layer from the rough side layer, there have been proposed a method for reducing the particle diameter of a lubricant to be contained in the rough side layer and a method for containing a small amount of a lubricant having a large particle diameter. However, sufficient air squeezability cannot be obtained in the former case because the height of protrusions formed on the surface of the rough side layer is low, whereas sufficient film slipperiness cannot be obtained in the latter case because the density of protrusions formed on the surface is low. Further, when the film is rolled, it wrinkles longitudinally in the former case and debris is formed in the latter case, thereby making it impossible to obtain a sufficient product yield.

Meanwhile, to further smoothen the magnetic layer application surface of the film in order to improve electromagnetic conversion characteristics, there is proposed a smooth layer which contains substantially no lubricant. In this case, the running properties of the smooth surface are unsatisfactory in the tape processing step, the film wrinkles in that step, and the product yield greatly drops.

SUMMARY OF THE INVENTION

The present inventor has conducted intensive studies to develop a film which solves the above problems at the same time and has accomplished the present invention.

That is, it is an object of the present invention to provide a biaxially oriented laminated polyester film in which the particle diameters and amounts of lubricants to be contained in its rough side and smooth side are specified and the surface roughnesses of its rough side and smooth side and the friction coefficient of the film are specified.

It is another object of the present invention to provide a biaxially oriented laminated polyester film which is useful as a base film for high-density magnetic recording media and has excellent electromagnetic conversion characteristics and also excellent winding properties and running properties as a film.

It is still another object of the present invention to provide a magnetic recording medium comprising the biaxially oriented laminated polyester film of the present invention as a base film.

Other objects and advantages of the present invention will become apparent from the following description.

According to the present invention, firstly, the above objects and advantages of the present invention are attained by a biaxially oriented laminated polyester film comprising:

(A) a polyester A layer (1) which contains at least the following three different types of inert fine particles in the following ratio:

(a) 0.001 to 0.1 wt % of first inert crosslinked polymer fine particles having an average particle diameter of 0.3 to 0.7 µm and a relative standard deviation of particle size distribution of 0.5 or less, (b) 0.05 to 0.4 wt % of second inert crosslinked polymer fine particles having an average particle diameter of 0.2 to 0.4 µm and a relative standard deviation of particle size distribution of 0.5 or less; and (c) 0.1 to 1.0 wt % of third inert fine particles having an average particle diameter of 0.01 to 0.3 µm, the average particle diameter of the second inert crosslinked polymer fine particles being 0.1 to 0.4 µm smaller than the average particle diameter of the first inert crosslinked polymer fine particles and 0.1 to 0.3 µm larger than the average particle diameter of the third inert fine particles, the three different types of inert fine particles showing clearly distinguishable three particle size peaks existent within the above ranges of average particle diameter in a particle size distribution curve, and (2) which has a surface roughness WRa of 5 to 20 nm and a surface roughness WRz of 100 to 300 nm; and (B) a polyester B layer formed on the polyester A layer and having a surface roughness WRa of 2 to 10 nm and a surface roughness WRz of 30 to 150 nm, wherein (C) the static friction coefficient between the exposed surface of the polyester A layer and the exposed surface of the polyester B layer is 0.5 or less.

Secondly, the above objects and advantages of the present invention are attained by a magnetic recording medium comprising the biaxially oriented laminated polyester film of the present invention and a magnetic layer formed on the polyester B layer of the biaxially oriented laminated polyester film.

DETAILED DESCRIPTION OF THE PREFERRED EMBODIMENT

Figure 1:
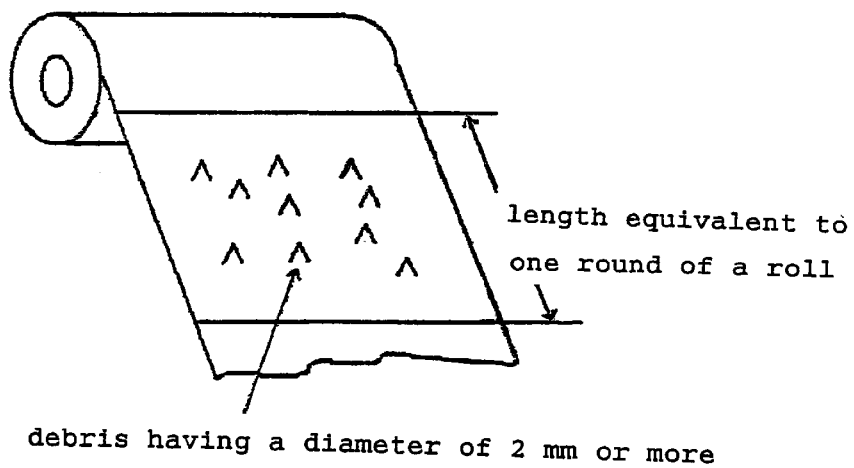
FIG. 1 is a diagram typically explaining the formation of debris when a film is rolled.

In the present invention, the polyesters constituting the polyester A layer and the polyester B layer are each a polyester which comprises an aromatic dicarboxylic acid as the main acid component and an aliphatic glycol as the main glycol component. This polyester is substantially linear and has film forming properties, particularly film forming properties by melt molding.

Examples of the aromatic dicarboxylic acid include terephthalic acid, 2,6-naphthalenedicarboxylic acid, isophthalic acid, diphenoxyethanedicarboxylic acid, diphenyldicarboxylic acid, diphenyl ether dicarboxylic acid, diphenylsulfone dicarboxylic acid, diphenyl ketone dicarboxylic acid and anthracenedicarboxylic acid. Examples of the aliphatic glycol include polymethylene glycols having 2 to 10 carbon atoms such as ethylene glycol, trimethylene glycol, tetramethylene glycol, pentamethylene glycol, hexamethylene glycol and decamethylene glycol, and alicyclic diols such as 1,4-cyclohexanedimethanol.

In the present invention, the polyester preferably comprises an alkylene terephthalate or alkylene-2,6-naphthalate as the main recurring unit, particularly preferably ethylene terephthalate as the main recurring unit or ethylene-2,6-naphthalene dicarboxylate as the main recurring unit.

Out of these polyesters, not only polyethylene terephthalate and polyethylene-2,6-naphthalate but also a copolymer comprising terephthalic acid or 2,6-naphthalenedicarboxylic acid in an amount of 80 mol % or more of the total of all the dicarboxylic acid components and ethylene glycol in an amount of 80 mol % or more of the total of all the glycol components are particularly preferred. 20 mol % or less of the total of all the acid components may consist of an aromatic dicarboxylic acid other than terephthalic acid or 2,6-naphthalenedicarboxylic acid, aliphatic dicarboxylic acid such as adipic acid or sebacic acid, or alicyclic dicarboxylic acid such as cyclohexane-1,4-dicarboxylic acid. 20 mol % or less of the total of all the glycol components may consist of a glycol other than ethylene glycol, aromatic diol such as hydroquinone, resorcin or 2,2-bis(4-hydroxyphenyl) propane, aliphatic diol having an aromatic ring such as 1,4-dihydroxydimethylbenzene, or polyalkylene glycol (polyoxyalkylene glycol) such as polyethylene glycol, polypropylene glycol or polytetramethylene glycol. Out of these, polyethylene terephthalate and polyethylene-2,6-naphthalate are particularly preferred.

The polyester in the present invention includes a polyester obtained by copolymerizing or bonding a component derived from an aromatic oxyacid such as hydroxybenzoic acid or aliphatic oxyacid such as ω-hydroxycaproic acid in an amount of 20 mol % or less based on the total weight of the dicarboxylic acid component and oxycarboxylic acid component.

The polyester in the present invention further includes a polyester obtained from copolymerizing a polycarboxylic acid having a functionality of 3 or more or polyhydroxy compound such as trimellitic acid or pentaerythritol in an amount that it is substantially linear, for example, 2 mol % or less of the total of all the acid components.

The above polyester is known per se and can be produced by a known process per se. The above polyester has an intrinsic viscosity measured at 35° C. in o-chlorophenol of preferably 0.4 to 0.9, more preferably 0.5 to 0.7, particularly preferably 0.55 to 0.65.

The biaxially oriented laminated polyester film of the present invention consists of a polyester A layer and a polyester B layer. The polyesters constituting the two layers may be the same or different but preferably the same.

In the film of the present invention, the polyester A layer contains three different types of inert fine particles. The three different types of inert fine particles are as follows.

(1) First inert crosslinked polymer fine particles having an average particle diameter of 0.3 to 0.7 µm and a relative standard deviation of particle size distribution of 0.5 or less (may be referred to as "lubricant $I_A$" hereinafter)

(2) Second inert crosslinked polymer fine particles having an average particle diameter of 0.2 to 0.4 µm and a relative standard deviation of particle size distribution of 0.5 or less (may be referred to as "lubricant $II_A$" hereinafter)

(3) Third inert fine particles having an average particle diameter of 0.01 to 0.3 µm (may be referred to as "lubricant $III_A$" hereinafter)

The average particle diameter ($DII_A$) of the lubricant $II_A$ is 0.1 to 0.4 µm smaller than the average particle diameter ($DI_A$) of the lubricant $I_A$ ($DI_A$−$DII_A$=0.1 to 0.4 µm) and 0.1 to 0.3 µm larger than the average particle diameter ($DIII_A$) of the lubricant $III_A$ ($DII_A$−$DIII_A$=0.1 to 0.3 µm).

Further, the content of the lubricant $I_A$ is 0.001 to 0.1 wt %, the content of the lubricant $II_A$ is 0.05 to 0.4 wt % and the content of the lubricant $III_A$ is 0.1 to 1.0 wt %.

The above three different types of inert fine particles are clearly distinguished from one another because they show clearly distinguishable three different particle size peaks existent within the above ranges of average particle diameter in the particle size distribution curve.

Further, the polyester A layer must have a surface roughness WRa of 5 to 20 nm and a WRz of 100 to 300 nm.

When large-sized particles are used in a single-component lubricant system, the content of the particles must be made low from the viewpoint of electromagnetic conversion characteristics, whereby the friction coefficient of the film is increased and debris is formed when the film is rolled, thereby making it difficult to roll it nicely. Although a double-component lubricant system is becoming better than the single-component lubricant system, as the film formation speed increases, the winding properties become worse and the particle diameter and the content of the particles cannot be well balanced in the double-component lubricant system as well.

The lubricant system of the above polyester A layer consists of three or more lubricants including the lubricant $I_A$, lubricant $II_A$ and lubricant $III_A$ which differ from one another in average particle diameter. The lubricant $I_A$ and the lubricant $II_A$ are crosslinked polymer fine particles and the lubricant $III_A$ is preferably crosslinked polymer fine particles or inert inorganic fine particles. Further, the average particle diameter ($DII_A$) of the lubricant $II_A$ must be 0.2 to 0.4 µm. It is preferably 0.25 to 0.35 µm, particularly preferably 0.28 to 0.32 µm. When this average particle diameter is smaller than 0.2 µm, air squeezability becomes insufficient and longitudinal wrinkles are formed, thereby making it difficult to roll the film nicely. When the average particle diameter is larger than 0.4 µm, the content of the lubricant cannot be increased so much from the viewpoint of electromagnetic conversion characteristics for ultra high-density magnetic recording media, whereby the friction coefficient of the film becomes high and it is difficult to roll the film nicely due to the formation of debris. The content of the lubricant $II_A$ must be 0.05 to 0.4 wt %. It is preferably 0.10 to 0.35 wt %, more preferably 0.15 to 0.30 wt %. When the content is lower than 0.05 wt %, the friction coefficient of the film becomes high and it is difficult to roll the film nicely due to the formation of debris. When the content is higher than 0.4 wt %, satisfactory electromagnetic conversion characteristics cannot be obtained.

The average particle diameter ($DI_A$) of the lubricant $I_A$ must be 0.1 to 0.4 µm larger than the average particle diameter ($DII_A$) of the lubricant $II_A$. The difference is preferably 0.15 to 0.35 µm, more preferably 0.20 to 0.30 µm. When the difference is smaller than 0.1 µm, improvement of air squeezability is small and satisfactory winding properties are not obtained. When the difference is larger than 0.4 µm, the formed protrusions become too large, greatly thrust up the flat layer side and are markedly transferred to the magnetic layer side at the time of winding a magnetic tape, whereby the magnetic surface becomes rough and satisfactory electromagnetic conversion characteristics are not obtained. The content of the lubricant $I_A$ must be 0.001 to 0.1 wt %. It is preferably 0.005 to 0.07 wt %, particularly preferably 0.01 to 0.05 wt %. When the content is lower than 0.05 wt %, improvement of air squeezability is small and satisfactory winding properties are not obtained. When the content is higher than 0.1 wt %, the surface becomes rough, greatly thrusts up the flat layer side and is markedly transferred to the magnetic layer side at the time of winding a magnetic tape, whereby the magnetic surface becomes rough and satisfactory electromagnetic conversion characteristics are not obtained.

Furthermore, the average particle diameter ($DIII_A$) of the lubricant $III_A$ must be 0.1 to 0.3 µm smaller than the average particle diameter ($DII_A$) of the lubricant $II_A$. The difference is preferably 0.15 to 0.25 µm, particularly preferably 0.18 to 0.22 µm. When the difference is smaller than 0.1 µm, the surface becomes rough, the magnetic surface also becomes rough and satisfactory electromagnetic conversion characteristics are not obtained. When the difference is larger than 0.3 µm, improvement of air squeezability is small and satisfactory winding properties are not obtained.

The content of the lubricant $III_A$ must be 0.1 to 1.0 wt %. It is preferably 0.1 to 0.5 wt %, more preferably 0.1 to 0.3 wt %. When the content is lower than 0.1 wt %, satisfactory winding properties are not obtained and when the content is higher than 1.0 wt %, satisfactory electromagnetic conversion characteristics are not obtained.

The standard deviations of particle size distribution of the lubricants $I_A$ and $II_A$ are 0.5 or less. When particles monodisperse in the film such as inert crosslinked polymer particles and silica particles are used as the lubricant $III_A$, the standard deviation of particle size distribution of the lubricant $III_A$ is also preferably 0.5 or less. When the lubricants have the above standard deviation, three particle size peaks existent within the respective ranges of average particle diameter in the particle size distribution curve of the lubricants can be clearly distinguished from one another.

Preferred examples of the above crosslinked polymer fine particles of the lubricants $I_A$ and $II_A$ include crosslinked polystyrene resin particles, crosslinked silicone resin particles, crosslinked acrylic resin particles, crosslinked styrene-acrylic resin, crosslinked polyester resin, polyimide particles and melamine resin particles. They may be used alone or in combination of two or more. When crosslinked polystyrene resin particles, crosslinked silicone resin particles or crosslinked acrylic resin particles are used out of these, the effect of the present invention becomes marked advantageously.

The lubricant $III_A$ may be crosslinked polymer fine particles or inert inorganic fine particles as described above. The same particles as those described above may be used as the crosslinked polymer fine particles and spherical silica particles and alumina particles are preferred as the inert inorganic particles.

The lubricant $III_A$ is preferably crosslinked silicone resin, crosslinked polystyrene resin, crosslinked acrylic resin or silica having a relative standard deviation of average particle diameter of 0.5 or less. When alumina particles are existent in the film in an agglomerated state, the alumina particles preferably have an average particle diameter of secondary particles of 0.01 to 0.3 µm. These lubricants $III_A$ may be used alone or in combination of two or more.

A preferred combination of the lubricants $I_A$ and $II_A$ constituting the polyester A layer is a combination of crosslinked silicone resins. In this case, the lubricant $III_A$ is preferably alumina particles.

The surface roughness WRa of the polyester A layer in the present invention must be 5 to 20 nm. It is preferably 8 to 15 nm, particularly preferably 10 to 15 nm. WRz must be 100 to 300 nm. It is preferably 100 to 250 nm, particularly preferably 150 to 250 nm. When the surface roughness WRa is larger than 20 nm or WRz is larger than 300 nm, the protrusions greatly thrust up the flat layer side and are markedly transferred to the magnetic layer side at the time of winding a magnetic tape, whereby the magnetic surface becomes rough and satisfactory electromagnetic conversion characteristics are not obtained. When WRa is smaller than 5 nm or WRz is smaller than 100 nm, the slipperiness of the film may worsen or the air squeezability of the film may deteriorate, whereby debris is formed or longitudinal wrinkles are formed at the time of slitting the film and satisfactory winding properties are not obtained.

In the film of the present invention, the polyester B layer is formed on the polyester A layer and has a WRa of 2 to 10 nm, and a WRz of 30 to 150 nm.

WRa is preferably 3 to 8 nm, particularly preferably 5 to 7 nm. WRz is preferably 50 to 150 nm, particularly preferably 80 to 130 nm. When this surface roughness WRa is larger than 10 nm or WRz is larger than 150 nm, the magnetic surface becomes rough and satisfactory electromagnetic conversion characteristics are not obtained. When the surface roughness WRa is smaller than 2 nm or WRz is smaller than 30 nm, the surface becomes too flat, the film cannot slide over the pass roll or calender smoothly or wrinkles, thereby making it impossible to apply a magnetic layer well or to calender the film well.

The above WRa and WRz values of the B layer can be obtained when the following fine particles are contained in the B layer.

(1) Fourth inert fine particles having an average particle diameter of 0.05 to 0.55 $\mu$m, preferably 0.1 to 0.5 $\mu$m, more preferably 0.1 to 0.3 $\mu$m and a relative standard deviation of particle size distribution of 0.5 or less are contained in an amount of 0.01 to 0.4 wt %, preferably 0.02 to 0.35 wt %, more preferably 0.05 to 0.3 wt %.

(2) Fifth inert crosslinked polymer fine particles having an average particle diameter of 0.2 to 0.55 $\mu$m, preferably 0.2 to 0.4 $\mu$m, more preferably 0.25 to 0.35 $\mu$m and a relative standard deviation of particle size distribution of 0.5 or less are contained in an amount of 0.01 to 0.2 wt %, preferably 0.02 to 0.15 wt %, more preferably 0.05 to 0.15 wt %, and sixth inert fine particles having an average particle diameter of 0.01 to 0.3 $\mu$m, preferably 0.05 to 0.2 $\mu$m, more preferably 0.10 to 0.15 $\mu$m are contained in an amount of 0.01 to 1.0 wt %, preferably 0.02 to 0.5 wt %, more preferably 0.05 to 0.15 wt %. The average particle diameter of the fifth inert crosslinked polymer fine particles is 0.1 to 0.3 $\mu$m larger than the average particle diameter of the sixth inert fine particles.

In the case of (1), crosslinked polymer fine particles or inert inorganic fine particles may be used as the fourth inert fine particles. Examples of these fine particles are the same as those enumerated for the polyester A layer.

When the average particle diameter of the inert fine particles is smaller than 0.05 $\mu$m and the content of the inert fine particles is lower than 0.01 wt %, the surface of the B layer becomes too flat, and the film cannot slide over the pass roll or calender well and wrinkles, whereby a magnetic layer can not be applied well or the film cannot be calendered well. When the average particle diameter is larger than 0.55 $\mu$m and the content is higher than 0.4 wt %, the magnetic surface becomes rough and satisfactory electromagnetic conversion characteristics are not obtained.

In the case of (2), examples of the crosslinked polymer fine particles as the fifth inert fine particles are the same as those enumerated for the polyester A layer. The sixth inert fine particles may be crosslinked polymer fine particles or inert inorganic fine particles. Examples of these are the same as those enumerated for the polyester A layer.

Preferred examples of the sixth inert fine particles are the same as preferred examples of the third inert fine particles.

In the biaxially oriented laminated polyester film of the present invention, the static friction coefficient between the polyester A layer and the polyester B layer must be 0.5 or less. It is preferably 0.45 or less, more preferably 0.4 or less. If the static friction coefficient is larger than 0.5, when the film is rolled, debris is formed, thereby making it difficult to roll the film nicely.

The biaxially oriented laminated polyester film of the present invention has a total thickness of preferably 2 to 10 $\mu$m, more preferably 3 to 7 $\mu$m, much more preferably 4 to 6 $\mu$m. When the thickness is larger than 10 $\mu$m, the thickness of the obtained tape becomes large, whereby the length of the tape loaded in a cassette becomes short and a sufficient magnetic recording capacity is hardly obtained. When the thickness is smaller than 2 $\mu$m, the film is easily broken at the time of film formation due to its small thickness, the winding properties of the film become unsatisfactory, and it is difficult to obtain a good film roll. Further, the thickness of the flat layer becomes small, the rough surface has a greater influence upon the surface properties of the smooth surface, and satisfactory surface properties are hardly obtained for the smooth surface.

Preferably, the thickness of the polyester A layer is in the range of 0.1 to 2.5 $\mu$m and the thickness of the polyester B layer is in the range of 1.0 to 9.5 $\mu$m.

Further, the ratio of the thickness of the polyester A layer to the thickness of the polyester B layer is preferably in the range of 1:1 to 1:20.

Preferably, the biaxially oriented laminated polyester film of the present invention has a Young's modulus in a one direction (for example, longitudinal direction) of preferably 4,904 MPa (500 kg/mm$^2$) or more and a Young's modulus in a direction perpendicular to the above direction (for example, transverse direction) of 3,923 MPa (400 kg/mm$^2$) or more and a total of Young's moduli in these two directions of 9,807 to 19,614 MPa (1,000 to 2,000 kg/mm$^2$).

The Young's modulus in the longitudinal direction of the biaxially oriented laminated polyester film of the present invention is preferably 5,884 MPa (600 kg/mm$^2$) or more, more preferably 6,865 MPa (700 kg/mm$^2$) or more, particularly preferably 7,846 MPa (800 kg/mm$^2$) or more and the Young's modulus in the transverse direction is preferably 4,904 MPa (500 kg/mm$^2$) or more, particularly preferably 5,884 MPa (600 kg/mm$^2$) or more. The total of Young's moduli in longitudinal and transverse directions is preferably 11,768 to 15,691 MPa (1,200 to 1,600 kg/mm$^2$), particularly preferably 12,259 to 14,711 MPa (1,250 to 1,500 kg/mm$^2$). When the obtained film is used as a base film for a linear type magnetic tape, the Young's modulus in a longitudinal direction of the film is preferably larger than the Young's modulus in a transverse direction to reduce elongation in the longitudinal direction of the film. When the Young's modulus in the longitudinal direction is smaller than 5,884 MPa (600 kg/mm$^2$), the magnetic tape is easily broken due to its reduced strength in the longitudinal direction if strong force is applied in the longitudinal direction at the time of recording or reproduction. When the Young's modulus in the transverse direction is smaller than 3,923 MPa (400 kg/mm$^2$), the dimensional change in the width direction of the tape becomes large at the time of temperature and humidity variations, an error occurs due to the dislocation of a track and therefore the tape can be hardly used for a satisfactory high-density magnetic recording medium. Further, when the total of Young's moduli in longitudinal and transverse directions is smaller than 9,807 MPa (1,000 kg/mm$^2$), the magnetic tape is easily broken due to its reduced strength, the dimensional change become large at the time of temperature and humidity variations, an error occurs due to the dislocation of a track, and therefore the tape can hardly be used for a satisfactory high-density magnetic recording medium. When the total of Young's moduli in the two directions is larger than 19,614 MPa (2,000 kg/mm$^2$), the draw ratio becomes high at the time of film formation, whereby the film is easily broken and the product yield greatly deteriorates.

The polyester A layer and the polyester B layer in the present invention are each made from preferably polyethylene terephthalate or polyethylene-2,6-naphthalate, more preferably polyethylene-2,6-naphthalate. Particularly when the total thickness of the film is 6 μm or more, they may be made from polyethylene terephthalate. However, when the total thickness is smaller than 6 μm, polyethylene-2,6-naphthalate is preferred because it can increase Young's moduli.

The biaxially oriented laminated polyester film of the present invention can be produced by any conventionally known method or method stored in the industry. For example, the biaxially oriented laminated polyester film of the present invention can be obtained from first producing an unstretched laminated film and stretching the film biaxially. This unstretched laminated film can be produced by any conventionally stored method for producing a laminated film. For example, a method in which a polyester A layer and a polyester B layer forming the opposite side are laminated together while the polyesters of the layers are molten or solidified by cooling can be employed. Stated more specifically, it can be produced by coextrusion, extrusion lamination or the like. The film laminated by the above method can be changed into a biaxially oriented film in accordance with any conventionally stored method for producing a biaxially oriented film. For example, polyesters are molten and coextruded at a temperature of melting point (Tm: ° C.) to (Tm+70)° C. to obtain an unstretched laminated film which is in turn stretched to 2.5 times or more, preferably 3.0 times or more uniaxially (longitudinal direction or transverse direction) at a temperature of (Tg−10) to (Tg+70)° C. (Tg: glass transition temperature of polyester) and then to 2.5 times or more, preferably 3.0 times or more in a direction perpendicular to the above stretching direction at a temperature of Tg to (Tg+70)° C. The biaxially oriented film may be further stretched again in a longitudinal direction and/or transverse direction as required. The total draw ratio is preferably 9 times or more, more preferably 12 to 35 times, particularly preferably 15 to 30 times in terms of area draw ratio. The biaxially oriented film can be heat set at a temperature of (Tg+70) to (Tg−10)° C., for example, 180 to 250° C. The heat setting time is preferably 1 to 60 seconds.

The biaxially oriented laminated polyester film of the present invention has excellent smoothness, slipperiness and winding properties and is preferably used as a base film for high-density magnetic recording media, particularly digital magnetic recording media.

The magnetic recording medium of the present invention consists of the above biaxially oriented laminated polyester film of the present invention and a magnetic layer formed on the B layer.

The biaxially oriented laminated polyester film of the present invention can be changed into a deposited magnetic recording medium for high-density recording which has excellent electromagnetic conversion characteristics such as output at a short-wavelength range, S/N and C/N, few drop outs and a small error rate by forming a ferromagnetic metal thin film layer made of iron, cobalt, chromium or an alloy or oxide essentially composed thereof on the surface of the polyester B layer by vacuum vapor deposition, sputtering, ion plating or the like, sequentially forming a protective layer of diamond-like carbon (DLC) or the like and a fluorine-containing carboxylic acid-based lubricant layer on the surface of the ferromagnetic metal thin film layer as required according to purpose and use, and further forming a known back coat layer on the surface of the polyester A layer.

The biaxially oriented laminated polyester film of the present invention can also be changed into a metal coated magnetic recording medium for high-density recording which has excellent electromagnetic conversion characteristics such as output at a short-wavelength range, S/N and C/N, few drop outs and a small error rate by uniformly dispersing iron or needle-like fine magnetic powders containing iron as the main component into a binder such as polyvinyl chloride or vinyl chloride-vinyl acetate copolymer on the surface of the polyester B layer and applying the obtained dispersion to form a magnetic layer having a thickness of 1 μm or less, preferably 0.1 to 1 μm. A non-magnetic layer may be optionally formed as a layer underlying the metal powder-containing magnetic layer by dispersing fine titanium oxide particles or the like in the same organic binder as that of the magnetic layer and applying the dispersion.

The above deposited magnetic recording medium or metal coated magnetic recording medium is extremely useful as a tape medium for video application such as 8 mm video, Hi8, β-cam SP, W-VHS, digital video cassette recorders (DVC), digital β-cam, D2, D3 and SX for digital signal recording, and for data application such as data 8 mm, DDSIV, DLT, S-DLT and LTO.

As for the magnetic recording medium of the present invention which records information on the magnetic layer in a linear system, the biaxially oriented laminated polyester film as a base film has a Young's modulus in a longitudinal direction which is 0.5 to 4 times, preferably 0.7 to 3 times, more preferably 0.9 to 2 times the Young's modulus in a transverse direction. As for the magnetic recording medium of the present invention which records information on the magnetic layer in a helical system, the biaxially oriented laminated polyester film as a base film has a Young's modulus in a transverse direction which is 0.5 to 4 times, preferably 0.5 to 3 times, more preferably 0.5 to 2 times the Young's modulus in a longitudinal direction.

EXAMPLES

The following Examples are provided to further illustrate the present invention.

The physical property values and characteristic properties in the present invention were measured as follows. They are not limited by the following measurement methods.

(1) Average Particle Diameter of Particles in Film (1-1) Average Particle Diameter of Particles Contained in Film The polyester is removed from the film surface layer by a low-temperature plasma ashing process (for example, the PR-503 of Yamato Kagaku Co., Ltd.) to expose particles. The process conditions are selected to ensure that the polyester is ashed and the particles are not damaged. The exposed particles are observed through a SEM (Scanning Electron Microscope) at a magnification of about X10,000 to analyze an image (light and shade formed by the particles) of the particles with an image analyzer (for example, QTM900 of Cambridge Instrument Co., Ltd.) so as to obtain the area circle equivalent diameters (Di) of at least 5,000 particles by changing the observation site. The particle size distribution curve of the particles is drawn from the obtained results to calculate the proportion of the number of particles of each peak (the area of each peak is defined by the valley portions of the distribution curve as boundaries). The number average value represented by the following expression is obtained from the measurement results of the particle diameters and the number of particles existent in the area of each peak and taken as the average particle diameter (DA) of the particles. In the case of particles existent in the film in an agglomerated state (for example, alumina particles), the particle diameter of the particles in the agglomerated state (secondary particle diameter) is measured to obtain an average particle diameter (DA). The type of particles is identified by the quantitative analysis of a metal element by SEM-XMA or ICP.

$$DA = \left(\sum_{i=1}^{n} Di\right) / n$$

(1-2) Relative Standard Deviation of Average Particle Diameter of Particles

The relative standard deviation is obtained from the number (n) of particles in each peak area and the area circle equivalent diameter (Di) measured in (1-1) above based on the following equation.

The particle size distribution of the particles existent in the film is preferably sharp in the present invention. The relative standard deviation of particle size distribution of particles monodisperse in the film such as inert crosslinked polymer particles and silica particles is 0.5 or less, preferably 0.4 or less, particularly preferably 0.3 or less.

In the case of particles existent in an agglomerated state, the average particle diameter of secondary particles is preferably in the range of 0.01 to 0.3 µm.

$$\text{relative standard deviation} = \sqrt{\frac{\sum_{i=1}^{n}(Di-DA)^2}{n}} / DA$$

wherein Di is the area circle equivalent diameter of each particle (µm), DA is the mean value of the area circle equivalent diameters $$\left(=\frac{\sum_{i=1}^{n} Di}{n}\right)$$

(µm) and n is the number of particles.

(2) Content of Particles (2-1) Total Content of Particles Contained in Each Layer 100 g samples are obtained by chipping the polyester A layer and the polyester B layer of the laminated polyester film, a solvent which dissolves the polyesters and not the particles is selected to dissolve the samples, the particles are separated from the polyesters by centrifugation, and the ratio (wt %) of the weight of the particles to the weight of each of the samples is taken as the total content of the particles in each layer.

(2-2) Total Content of Inorganic Particles in Each Layer

When inorganic particles are contained in the laminated polyester film, 100 g samples are obtained by chipping the polyester A layer and the polyester B layer and burnt in a furnace heated at 1,000° C. in a platinum crucible for more than 3 hours, and the burnt product in the crucible is mixed with terephthalic acid (powder) to form a 50 g tablet type plate. The content of each element in this plate is calculated based on the prepared calibaration curve of each element from a count value of each element obtained using wavelength dispersion type fluorescent X-rays to determine the total content of inorganic particles in each layer. The X-ray tube for measuring fluorescent X-rays is preferably a Cr tube and an Rh tube may be used for the measurement. The X-ray output is set at 4 kW and the spectral crystal is changed for each element to be measured. When different types of inorganic particles are existent, the content of each type of inorganic particles is determined by this measurement.

(2-3) Content of Each Type of Particles in Each Layer (When Inorganic Particles are not Existent)

When inorganic particles are not existent in the layer, the weight ratio of particles existent in each peak area is calculated from the proportion of the number of particles, the average particle diameter of the particles and the density of the particles constituting each peak obtained in (1-1) above and the content (wt %) of the particles existent in each peak area is obtained from the obtained value and the total content of particles in each layer obtained in (2-1) above.

The densities of typical fine particles are as follows. density of crosslinked silicone resin: 1.35 g/cm$^3$ density of crosslinked polystyrene resin: 1.05 g/cm$^3$ density of crosslinked acrylic resin: 1.20 g/cm$^3$ The density of the resin can be measured in accordance with, for example, the method described in "Fine Particle Handbook: Asakura Shoten, 1991, p.150" with a pycnometer by separating particles which has been centrifugally separated from the polyester by the method (2-1).

(2-4) Content of Each Type of Particles in Each Layer (When Inorganic Particles are Existent)

When inorganic particles are existent in the layer, the content of organic particles in the layer and the content of inorganic particles in the layer are calculated from the total content of particles in each layer obtained in (2-1) above and the total content of inorganic particles in each layer obtained in (2-2) above, the content (wt %) of organic particles is obtained by the method of (2-3) above and the content (wt %) of inorganic particles is obtained by the method (2-2) above.

(3) Layer Thickness

Using a secondary ion mass spectrometer (SIMS), the concentration ratio of an element derived from particles having the highest concentration out of particles contained in the film of a portion from the surface layer to a depth of 3,000 nm to the carbon element of the polyester ($M^+/C^+$) is taken as the concentration of particles, and the portion from the surface to a depth of 3,000 nm is analyzed in the thickness direction. The particle concentration of the surface layer is low because the surface is an interface but becomes higher as the distance from the surface increases. The particle concentration which has reached the maximal value begins to decrease again. Based on this concentration distribution curve, a depth (larger than a depth at which the particle concentration becomes maximal) where the particle concentration of the surface layer becomes (maximal value)/2 is obtained and taken as the thickness of the surface layer. Conditions are as follows.

(1) Measurement Apparatus Secondary Ion Mass Spectrometer (SIMS)

(2) Measurement Conditions Type of Primary Ions: $O_2^+$
   primary ion acceleration voltage: 12 kV
   primary ion current: 200 nA
   luster area: 400 μm□
   analytical area: 30% of gate
   measurement vacuum degree: 0.8 Pa ($6.0×10^{-3}$ Torr)
   E-GUN: 0.5 KV–3.0 A When the particles which are contained the most in an area from the surface layer to a depth of 3,000 nm are organic polymer particles, it is difficult to measure them with SIMS. Therefore, the same depth profile as described above may be measured by XPS (X-ray photoelectron spectrometry), IR (infrared spectrometry) or the like while etching from the surface to obtain the thickness of the surface layer.

(4) Young's Modulus

The film is cut to a width of 10 mm and a length of 15 cm, and this obtained sample is pulled by an Instron type universal tensile tester at a chuck interval of 100 mm, a pulling rate of 10 mm/min and a chart rate of 500 mm/min. The Young's modulus is calculated from the tangent of a rising portion of the obtained load-elongation curve.

(5) Surface Roughness (WRa, WRz)

Using the non-contact 3-D roughness meter (NT-2000) of WYKO Co., Ltd., the surface roughness is measured a number of times (n) of 10 or more under such conditions as a measurement area of 246.6 μm×187.5 μm (0.0462 mm$^2$) and a measurement magnification of 25×, and the center plane average roughness (WRa: nm) and 10-point average roughness (WRz: nm) are calculated with surface analysis software incorporated in the roughness meter.

(A) Center Plane Average Roughness (WRa)

$$WRa = \sum_{k=1}^{m} \sum_{j=1}^{n} |Z_{jk} - \overline{Z}|/(m \cdot n)$$

$$\text{provided } \overline{Z} = \sum_{k=1}^{m} \sum_{j=1}^{n} Z_{jk} - \overline{Z}/(m \cdot n).$$

$Z_{jk}$ is a height on a 2-D roughness chart at a j-th position and a k-th position in a measurement direction (246.6 μm) and a direction perpendicular to the measurement direction (187.5 μm) when these directions are divided into m and n sections, respectively.

(B) 10-point Average Roughness (WRz)

The average roughness WRz is obtained by averaging the roughnesses of the highest 5 peaks (Hp) and the lowest 5 valleys (Hv).

$$WRz=[(H_{p1}+H_{p2}+H_{p3}+H_{p4}+H_{p5})-(H_{v1}+H_{v2}+H_{v3}+H_{v4}+H_{v5})]×1/5$$

(6) Winding Properties

Figure 2:
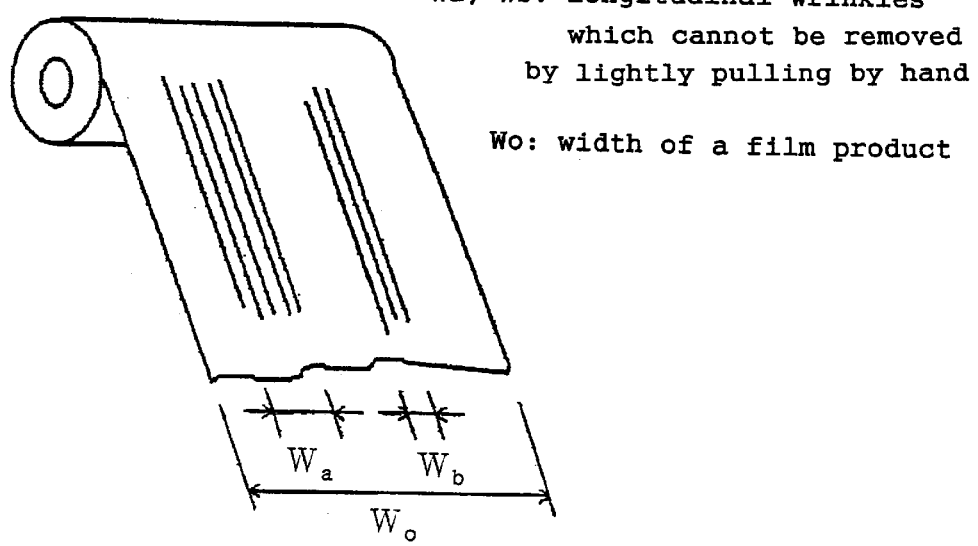
FIG. 2 is a diagram typically explaining the formation of longitudinal wrinkles of the film and how to obtain the proportion of the wrinkles.

The number of 2 mm or more diameter pieces of debris (see FIG. 1) and the formation of longitudinal wrinkles (see FIG. 2) are measured when a 6,000 m long and 1,000 mm wide film is rolled, and the number of pieces of debris per m in length is calculated. The mean value per roll when 10 films are rolled is obtained and evaluated as follows.

(A) Debris
   ⊚: 0 to 2 pieces/m
   ○: 3 to 5 pieces/m
   Δ: 6 to 10 pieces/m
   X: 11 or more pieces/m (B) Longitudinal Wrinkles
   ⊚: 0% or more and less than 10%
   ○: 10% or more and less than 20%
   Δ: 20% or more and less than 30%
   X: 30% or more (7) Film Thickness Ten films are placed one upon another in such a manner that dust should not be inserted therebetween and the total thickness of the films is measured by an intermittent electronic micrometer to calculate the thickness of each film.

(8) Running Properties

Wrinkling caused by poor slipperiness between the smooth surface of the film and the metal roll in the magnetic layer application step or the calendering step when a tape is formed from a film roll having a width of 1,000 mm is evaluated as follows.
   ⊚: not wrinkles at all
   ○: slightly wrinkles but no problem in the step
   Δ: wrinkles but can be used in the step
   X: significantly wrinkles and cannot be used (9) Electromagnetic Conversion Characteristics The electromagnetic conversion characteristics are measured by using the ML4500B QIC system of Media Logic Co., Ltd. The measurement data is evaluated based on the following criteria when S/N of Example 1 is 0 dB.
   ⊚: +3 dB or more
   ○: +1 dB or more and less than +3 dB
   X: less than +1 dB

(10) Static Friction Coefficient of Film

A fixed glass plate is placed under two films which are placed one upon the other, the lower film (in contact with the glass plate) is pulled with a constant speed roll (about 10 cm/min), and a detector is fixed to one end of the upper film (opposite end to the pulling direction of the lower film) to detect tensile force between the films at the time of start. The sled used for this purpose has a weight of 1 kg and an under surface area of 100 cm$^2$.

The static friction coefficient (μs) is obtained from the following equation.

μs=(tensile force at the time of start (kg))/(load of 1 kg)

(11) Chipping Resistance

Figure 3:
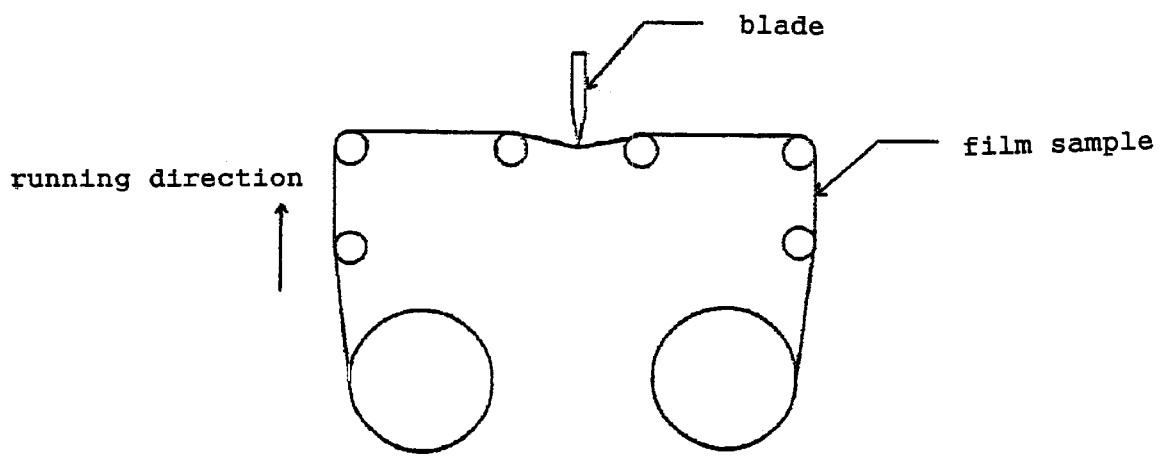
FIG. 3 is a diagram typically explaining a device for measuring the chipping resistance of the film.

The edge of a razor testing blade for industrial use of GKI Co., Ltd. of the US is applied to the film at an angle of 6° using the device shown in FIG. 3 and the chipping resistance of the film is evaluated based on the amount of chippings adhered to the edge of the blade under the following running conditions.
   running conditions:
      speed: 60 m/min, tension: 60 g, running distance: 50 m
   criteria:
      ⊚: the amount of chippings adhered to the edge of the blade is less than 0.5 mm
      ○: the amount of chippings adhered to the edge of the blade is 0.5 mm or more and less than 1.0 mm
      X: the amount of chippings adhered to the edge of the blade is 1.0 mm or more This evaluation well corresponds to chippings formed in the magnetic tape production process, particularly chippings formed by a die coater.

EXAMPLE 1

A polyethylene terephthalate pellet for the A layer which contained 0.02 wt % of crosslinked silicone resin particles having an average particle diameter of 0.5 µm and a relative standard deviation of 0.15, 0.20 wt % of crosslinked silicone resin particles having an average particle diameter of 0.3 µm and a relative standard deviation of 0.15, and 0.6 wt % of alumina particles having an average particle diameter (secondary particle diameter) of 0.1 µm and a polyethylene terephthalate pellet for the B layer which contained 0.06 wt % of crosslinked silicone resin particles having an average particle diameter of 0.3 µm and a relative standard deviation of 0.15 were dried at 170° C. for 3 hours, supplied to the hoppers of two extruders, molten at 300° C. and coextruded from a multi-manifold coextrusion die to form a laminate where the A layer is laminated on one side of the B layer, and the resulting laminate was subjected to a surface finish of about 0.3 S and extruded onto a casting drum having a surface temperature of 25° C. to obtain an unstretched laminated film. The thickness of each layer of the laminate was adjusted by the delivery rates of the two extruders to obtain surface roughnesses shown in Table 2.

The thus obtained unstretched film was preheated at 75° C., stretched to 2.25 times between low-speed and high-speed rolls by heating with an IR heater having a surface temperature of 830° C. from 14 mm above, quenched, supplied to a stenter and stretched to 3.6 times in a transverse direction at 110° C. Subsequently, the stretched film was preheated at 110° C., stretched to 2.5 times in a longitudinal direction between low-speed and high-speed rolls, supplied to a stenter and heat set at 210° C. for 10 seconds to obtain a 6.0 µm-thick biaxially oriented laminated film. This film had a Young's modulus in a longitudinal direction of 7,846 MPa (800 kg/mm$^2$) and a Young's modulus in a transverse direction of 4,707 MPa (480 kg/mm$^2$).

Meanwhile, after the following composition was placed in a ball mill, kneaded for 16 hours and dispersed, 5 parts by weight of an isocyanate compound (Desmodule L of Bayer AG) was added and dispersed at a high shear rate for 1 hour to obtain a magnetic coating.

| composition of magnetic coating: | |
|---|---|
| needle-like Fe particles | 100 parts by weight |
| vinyl chloride-vinyl acetate copolymer (Eslec 7A of Sekisui Chemical Co., Ltd.) | 15 parts by weight |
| thermoplastic polyurethane resin | 5 parts by weight |
| chromium oxide | 5 parts by weight |
| carbon black | 5 parts by weight |
| lecithin | 2 parts by weight |
| fatty acid ester | 1 parts by weight |
| toluene | 50 parts by weight |
| methyl ethyl ketone | 50 parts by weight |
| cyclohexanone | 50 parts by weight |

This magnetic coating was applied to one side (B layer) of the above biaxially oriented laminated film to a thickness of 0.5 µm and then oriented in a 0.25 tesla (2,500 Gauss) DC magnetic field, dried by heating at 100° C., supercalendered (linear pressure of 200 kg/cm, temperature of 80° C.) and wound up. This wound roll was left in an oven at 55° C. for 3 days.

Further, a back coat layer coating having the following composition was applied to the other side (A layer) of the biaxially oriented laminated film to a thickness of 1 µm, dried and cut to a width of 6.35 mm (=1'/4) to obtain a magnetic tape.

| composition of back coat layer coating: | |
|---|---|
| carbon black | 100 parts by weight |
| thermoplastic polyurethane resin | 60 parts by weight |
| isocyanate compound (Colonate L of Nippon Polyurethane Kogyo Co., Ltd.) | 18 parts by weight |
| silicone oil | 0.5 parts by weight |
| methyl ethyl ketone | 250 parts by weight |
| toluene | 50 parts by weight |

The characteristic properties of the obtained film and tape are shown in Table 2. As is obvious from this table, they were satisfactory in terms of chipping resistance, winding properties, running properties and electromagnetic conversion characteristics.

EXAMPLES 2 AND COMPARATIVE EXAMPLES 1 TO 5

Biaxially oriented laminated films were obtained in the same manner as in Example 1 except that the added particles were changed as shown in Table 1. These films had a Young's modulus in a longitudinal direction of 7,846 MPa (800 kg/mm$^2$) and a Young's modulus in a transverse direction of 4,707 MPa (480 kg/mm$^2$). A magnetic coating was applied to the surface of the B layer of each of the films and a back coat layer coating was applied to the surface of the A layer of each of the film in the same manner as in Example 1, dried and cut to a width of 6.35 mm (=1'/4) to obtain magnetic tapes.

The evaluation results of the magnetic tapes are shown in Table 2. As is obvious from this table, Example 2 was satisfactory in terms of chipping resistance, winding properties, running properties and electromagnetic conversion characteristics whereas Comparative Examples 1 to 5 were inferior in these properties.

EXAMPLE 3

A polyethylene-2,6-naphthalate pellet for the A layer which contained 0.008 wt % of crosslinked polystyrene resin particles having an average particle diameter of 0.6 µm and a relative standard deviation of 0.15, 0.25wt % of crosslinked silicone resin particles having an average particle diameter of 0.3 µm and a relative standard deviation of 0.15, and 0.3 wt % of crosslinked acrylic resin particles having an average particle diameter of 0.1 µm and a relative standard deviation of 0.15 and a polyethylene-2,6-naphthalate pellet for the B layer which contained 0.25 wt % of spherical silica particles having an average particle diameter of 0.15 µm and a relative standard deviation of 0.10 were dried at 180° C. for 5 hours, supplied to the hoppers of two extruders, molten at 300° C. and coextruded from a multi-manifold coextrusion die to form a laminate where the A layer is laminated on one side of the B layer, and the resulting laminate was subjected to a surface finish of about 0.3 S and extruded onto a casting drum having a surface temperature of 60° C. to obtain an unstretched laminated film. The thickness of each layer of the laminate was adjusted by the delivery rates of the two extruders to obtain surface roughnesses shown in Table 2.

The thus obtained unstretched film was stretched to 5.5 times between low-speed and high-speed rolls which differed from each other in speed at a temperature of 120° C., stretched to 4.1 times in a transverse direction by a stenter, and then heat set at 210° C. for 10 seconds. This film had a Young's modulus in a transverse direction of 5,884 MPa (600 kg/mm$^2$) and a Young's modulus in a longitudinal direction of 8,826 MPa (900 kg/mm$^2$).

A magnetic coating was applied to the surface of the B layer of this biaxially oriented laminated film and a back coat layer coating was applied to the surface of the A layer in the same manner as in Example 1, dried and cut to a width of 6.35 mm (=1'/4) to obtain a magnetic tape.

The evaluation results are shown in Table 2. As is obvious from this table, Example 3 was satisfactory in terms of chipping resistance, winding properties, running properties and electromagnetic conversion characteristics.

TABLE 1

| | | | unit | Ex. 1 | Ex. 2 | Ex. 3 | C. Ex. 1 | C. Ex. 2 | C. Ex. 3 | C. Ex. 4 | C. Ex. 5 |
|---|---|---|---|---|---|---|---|---|---|---|---|
| polymer | | | | PET | PET | PEN | PET | PET | PET | PET | PET |
| lubricant | lubricant $I_A$ for A layer | type of lubricant | | crosslinked silicone resin particle | crosslinked silicone resin particle | crosslinked polystyrene resin particle | crosslinked silicone resin particle | spherical silica | crosslinked polystyrene resin particle | — | crosslinked silicone resin particle |
| | | average particle diameter | μm | 0.5 | 0.5 | 0.6 | 0.5 | 0.5 | 0.8 | — | 0.5 |
| | | relative standard deviation | | 0.15 | 0.15 | 0.15 | 0.15 | 0.10 | 0.15 | — | 0.15 |
| | | amount | wt % | 0.02 | 0.02 | 0.008 | 0.02 | 0.03 | 0.03 | — | 0.015 |
| | lubricant $II_A$ for A layer | type of lubricant | | crosslinked silicone resin particle | crosslinked silicone resin particle | crosslinked silicone resin particle | spherical silica | crosslinked silicone resin particle | crosslinked silicone resin particle | spherical silica | — |
| | | average particle diameter | μm | 0.3 | 0.3 | 0.3 | 0.3 | 0.3 | 0.5 | 0.3 | — |
| | | relative standard deviation | | 0.15 | 0.15 | 0.15 | 0.10 | 0.15 | 0.15 | 0.10 | — |
| | | amount | wt % | 0.20 | 0.20 | 0.25 | 0.30 | 0.20 | 0.20 | 0.20 | — |
| | lubricant $III_A$ for A layer | type of lubricant | | alumina | spherical silica | crosslinked acrylic resin particle | alumina | alumina | alumina | alumina | alumina |
| | | average particle diameter | μm | 0.1 | 0.15 | 0.1 | 0.1 | 0.1 | 0.1 | 0.1 | 0.1 |
| | | relative standard deviation | | — | 0.10 | 0.15 | — | — | — | — | — |
| | | amount | wt % | 0.6 | 0.2 | 0.3 | 0.6 | 0.6 | 0.4 | 0.3 | 0.4 |
| | lubricant I for B layer | type of lubricant | | crosslinked silicone resin particle | crosslinked silicone resin particle | spherical silica | crosslinked silicone resin particle | crosslinked silicone resin particle | spherical silica | spherical silica | spherical silica |
| | | average particle diameter | μm | 0.3 | 0.5 | 0.15 | 0.3 | 0.3 | 0.5 | 0.3 | 0.15 |
| | | relative standard deviation | | 0.15 | 0.15 | 0.10 | 0.15 | 0.15 | 0.10 | 0.10 | 0.10 |
| | | amount | wt % | 0.06 | 0.01 | 0.25 | 0.06 | 0.06 | 0.08 | 0.10 | 0.01 |
| | lubricant II for B layer | type of lubricant | | | alumina | | | | alumina | | |
| | | average particle diameter | μm | | 0.1 | | | | 0.1 | | |
| | | relative standard deviation | | | — | | | | — | | |
| | | amount | wt % | | 0.4 | | | | 0.4 | | |

Ex.: Example
C. Ex.: Comparative Example

TABLE 2

| | | | unit | Ex. 1 | Ex. 2 | Ex. 3 | C. Ex. 1 | C. Ex. 2 | C. Ex. 3 | C. Ex. 4 | C. Ex. 5 |
|---|---|---|---|---|---|---|---|---|---|---|---|
| surface roughness | A layer | WRa | nm | 13 | 12 | 12 | 13 | 13 | 18 | 11 | 4 |
| | | WRz | nm | 180 | 180 | 250 | 180 | 180 | 350 | 150 | 90 |
| | B layer | WRa | nm | 7 | 3 | 5 | 7 | 7 | 11 | 7 | 1.5 |
| | | WRz | nm | 110 | 80 | 60 | 110 | 110 | 200 | 110 | 20 |
| film friction coefficient | | | | 0.37 | 0.39 | 0.39 | 0.37 | 0.37 | 0.30 | 0.41 | 0.55 |
| chipping resistance | A layer | | | ◉ | ◉ | ◉ | X | X | ○ | X | ◉ |
| | B layer | | | ◉ | ◉ | ○ | ○ | ○ | X | X | ○ |
| winding properties | | | | ○ | ○ | ◉ | ○ | ○ | ◉ | X | X |

TABLE 2-continued

| | unit | Ex. 1 | Ex. 2 | Ex. 3 | C. Ex. 1 | C. Ex. 2 | C. Ex. 3 | C. Ex. 4 | C. Ex. 5 |
|---|---|---|---|---|---|---|---|---|---|
| running properties | | ⊚ | ⊚ | ○ | ⊚ | ⊚ | ⊚ | ⊚ | X |
| electromagnetic conversion characteristics | | ○ | ○ | ⊚ | ○ | ○ | X | ○ | X |

Ex.: Example
C. Ex.: Comparative Example

What is claimed is:

1. A biaxially oriented laminated polyester film comprising:
   (A) a polyester A layer (1) which contains at least the following three different types of inert fine particles in the following ratio:
      (a) 0.001 to 0.1 wt % of first inert crosslinked polymer fine particles having an average particle diameter of 0.3 to 0.7 μm and a relative standard deviation of particle size distribution of 0.5 or less,
      (b) 0.05 to 0.4 wt % of second inert crosslinked polymer fine particles having an average particle diameter of 0.2 to 0.4 μm and a relative standard deviation of particle size distribution of 0.5 or less; and
      (c) 0.1 to 1.0 wt % of third inert fine particles having an average particle diameter of 0.01 to 0.3 μm, the average particle diameter of the second inert crosslinked polymer fine particles being 0.1 to 0.4 μm smaller than the average particle diameter of the first inert crosslinked polymer fine particles and 0.1 to 0.3 μm larger than the average particle diameter of the third inert fine particles, the three different types of inert fine particles showing clearly distinguishable three particle size peaks existent within the above ranges of average particle diameter in a particle size distribution curve, and (2) which has a surface roughness WRa of 5 to 20 nm and a surface roughness WRz of 100 to 300 nm; and
   (B) a polyester B layer formed on the polyester A layer and having a surface roughness WRa of 2 to 10 nm and a surface roughness WRz of 30 to 150 nm, wherein
   (C) the static friction coefficient between the exposed surface of the polyester A layer and the exposed surface of the polyester B layer is 0.5 or less.

2. The biaxially oriented laminated polyester film of claim 1, wherein the first inert crosslinked polymer fine particles are made of at least one resin selected from the group consisting of crosslinked silicone resin, crosslinked polystyrene resin and crosslinked acrylic resin.

3. The biaxially oriented laminated polyester film of claim 1, wherein the second inert crosslinked polymer fine particles are made of at least one resin selected from the group consisting of crosslinked silicone resin, crosslinked polystyrene resin and crosslinked acrylic resin.

4. The biaxially oriented laminated polyester film of claim 1, wherein the third inert fine particles are made of at least one selected from the group consisting of crosslinked silicone resin, crosslinked polystyrene resin, crosslinked acrylic resin and silica having a relative standard deviation of average particle diameter of 0.5 or less, and alumina having an average particle diameter (second particle diameter) of 0.01 to 0.3 μm.

5. The biaxially oriented laminated polyester film of claim 1, wherein the first inert crosslinked polymer fine particles and the second inert crosslinked polymer fine particles are both crosslinked silicone resin particles.

6. The biaxially oriented laminated polyester film of claim 1, wherein the first inert crosslinked polymer fine particles and the second inert crosslinked polymer fine particles are both crosslinked silicone resin particles and the third inert fine particles are alumina fine particles.

7. The biaxially oriented laminated polyester film of claim 1, wherein the polyester B layer contains fourth inert fine particles having an average particle diameter of 0.05 to 0.55 μm and a relative standard deviation of particle size distribution of 0.5 or less in an amount of 0.01 to 0.4 wt %.

8. The biaxially oriented laminated polyester film of claim 1, wherein the polyester B layer contains the following two different types of inert fine particles in the following ratio:
   (a) 0.01 to 0.2 wt % of fifth inert crosslinked polymer fine particles having an average particle diameter of 0.2 to 0.55 μm and a relative standard deviation of particle size distribution of 0.5 or less, and
   (b) 0.01 to 1.0 wt % of sixth inert fine particles having an average particle diameter of 0.01 to 0.3 μm, the average particle diameter of the fifth inert crosslinked polymer fine particles being 0.1 to 0.3 μm larger than the average particle diameter of the sixth inert fine particles.

9. The biaxially oriented laminated polyester film of claim 8, wherein the sixth inert fine particles are made of at least one selected from the group consisting of crosslinked silicone resin, crosslinked polystyrene resin, crosslinked acrylic resin and silica having a relative standard deviation of average particle diameter of 0.5 or less and alumina having an average particle diameter (secondary particle diameter) of 0.01 to 0.3 μm.

10. The biaxially oriented laminated polyester film of claim 1 which has a Young's modulus in one direction of 4,904 MPa (500 kg/mm$^2$) or more and a Young's modulus in a direction perpendicular to the above direction of 3,923 MPa (400 kg/mm$^2$) or more, and the total of the Young's moduli in the two directions is 9,807 to 19,614 MPa (1,000 to 2,000 kg/mm$^2$).

11. The biaxially oriented laminated polyester film of claim 1, wherein the thickness of the polyester A layer is in the range of 0.1 to 2.5 μm and the thickness of the polyester B layer is in the range of 1.0 to 9.5 μm.

12. The biaxially oriented laminated polyester film of claim 10, wherein the ratio of the thickness of the polyester A layer to the thickness of the politer B layer is 1:1 to 1:20.

13. The biaxially oriented laminated polyester film of claim 1 which has a thickness of 2 to 10 μm.

14. The biaxially oriented laminated polyester film of claim 1, wherein the polyester comprises ethylene terephthalate or ethylene-2,6-naphthalene dicarboxylate as the main recurring unit.

15. A magnetic recording medium comprising the biaxially oriented laminated polyester film of claim 1 and a magnetic layer formed on the polyester B layer thereof.

16. The magnetic recording medium of claim 15, wherein the biaxially oriented laminated polyester film has a Young's modulus in a longitudinal direction which is 0.5 to 4 times the Young's modulus in a transverse direction and information is recorded on the magnetic layer in a linear system.

17. The magnetic recording medium of claim 15, wherein the biaxially oriented laminated polyester film has a Young's modulus in a transverse direction which is 0.5 to 4 times the Young's modulus in a longitudinal direction and information is recorded on the magnetic layer in a helical system.

\* \* \* \* \*